(No Model.)
T. D. DAVIS.
HAND RAKE.
No. 337,932. Patented Mar. 16, 1886.
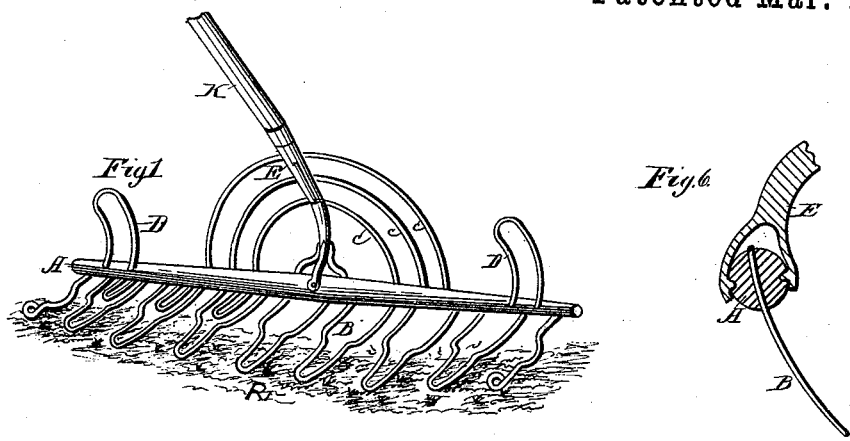
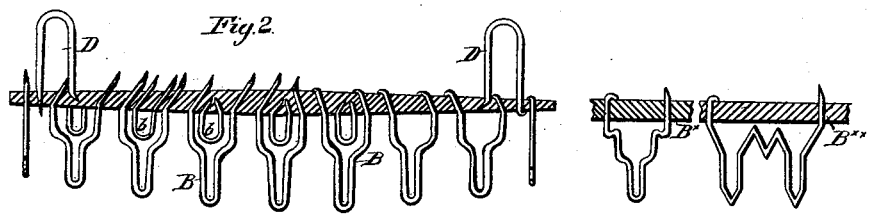
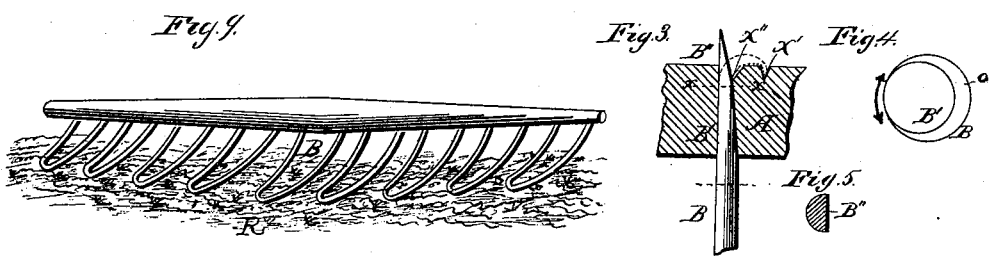
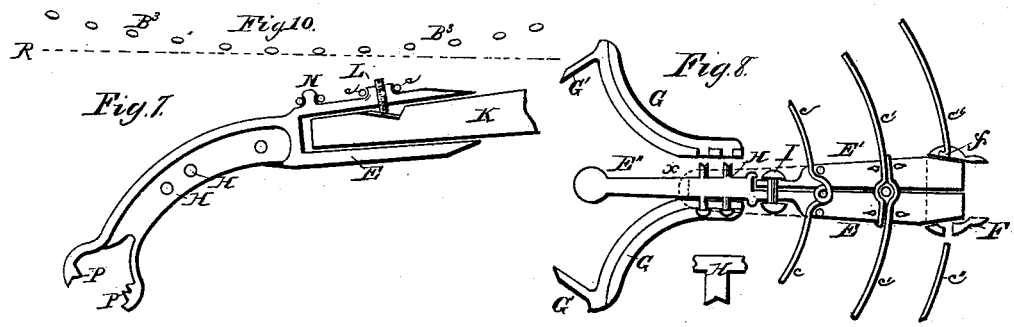
WITNESSES
Fred. G. Dieterich
Will R. Omshundro
By Attorneys
INVENTOR
Theodore D. Davis

UNITED STATES PATENT OFFICE.

THEODORE D. DAVIS, OF SYRACUSE, NEW YORK.

HAND-RAKE.

SPECIFICATION forming part of Letters Patent No. 337,932, dated March 16, 1886.

Application filed April 18, 1881. Serial No. 31,064. (No model.)

*To all whom it may concern:*

Be it known that I, THEODORE D. DAVIS, a citizen of the United States, residing at Syracuse, in the county of Onondaga and State of New York, have invented a new and useful Hand-Rake for Field, Lawn, and Garden Purposes, (said rake has not been patented to me or with my knowledge or consent in any foreign country,) of which the following is a specification.

My invention relates to improvements in hand-rakes used for field purposes, and also for lawns and gardens; and it consists, first, in the form and arrangement of the teeth; second, in the manner of securing the teeth and braces in the head; third, in the manner of combining and securing the parts of the socket and braces together; fourth, in the manner of securing the handle in the socket, all as hereinafter described, and more particularly pointed out in the claims. I attain these objects in the manner shown in the accompanying drawings, in which—

Figure 1 is a perspective view. Fig. 2 is a sectional view showing the manner of inserting and securing the teeth. Fig. 3 are sectional views showing the forms of the shank of the tooth and the mode of securing the teeth in the head. Fig. 4 is an enlarged view of the shank of the tooth in cross-section. Fig. 5 is also a view in cross-section, taken on or near the line $x$, Fig. 3. Fig. 6 is a sectional view of the head-tooth and end of socket-shank. Fig. 7 is a sectional view of the socket and handle. Fig. 8 is a sectional plan view of the socket and braces, showing the manner of securing the parts. Figs. 9 and 10 are figures showing the location of the points of the teeth.

Similar letters refer to similar parts throughout the several views.

The teeth are preferably made of steel wire doubled, running from a circular point or end in parallel lines a portion of the length, then bent outward, then inward, running to the head in lines parallel, or nearly so, with the narrow portion of the tooth. If desirable, more bends may be made, forming edges similar to a series of steps, as shown at $B^x$, Fig. 2, or bent, as shown at $B^{xx}$, Fig. 2. This will prevent the matter operated on from sticking fast between the teeth. The teeth from the center of the head gradually decrease in length toward the ends of the head; consequently are stiffer and less liable to bend and catch in using. The teeth are bent forward, forming a segment of a circle, as shown at Fig. 6.

For lawn purposes, and to enable the rake to gather substances in depressions of the surface, the points or ends of the teeth are gradually raised by bending them forward at or near the rake-head, from the center to the ends of the head, as shown in Fig. 10, in which R represents a level plain or surface, $B^3$ showing the position of the ends of the teeth when the head and teeth lie flat on the ground, giving the series of teeth about the form that they would assume if bent over a globe. The shank of the tooth is bent and passes through an aperture in the head (preferably of wood) in an oblique direction, giving the shank a longer bearing, and transferring the tensile and compressive strain on the tooth from a direct to an angular line, thereby providing additional security for the tooth, and also furnishes an obtuse angle over which to clinch the end of the shank. The shank of the tooth is made in a tapering or conical form, as shown at Fig. 3, the end of the shank $B''$ being flattened on one side from the end to a point below where the bend commences, the flattened portion being the subtense of an acute right-angled triangle. After being forced into the head, the tooth is secured by bending the end over on the head in the direction of its length, and in the end tooth, which is made of a single wire, a hook is turned over, as shown at $x'$ in Fig. 3, and driven into the head, to prevent the tooth from turning. If desired, the taper may extend in a straight line from the end of the shank through or nearly through the head, in which case the shank will be flat on one side. Either form of shank, it is obvious, will secure the tooth firmly in place, whatever may be the form or shape of the member or members of the main portion of the tooth. The tapered ends of the shanks when in position are inclined toward the center, and may be clinched by the operation of rolling a weighted wheel over them from each end to the center, or by means of a lever or other suitable device; or the unbroken sides of the ends of the shanks may all be toward one end of the rake-head and be bent over at one operation.

In working steel and iron it is found that if the skin or outer surface, which is of a fibrous nature, and is acquired by rolling, drawing, or otherwise, is removed or injured, it cannot be clinched or bent short without fracture, owing to the crystalline nature of the core or interior of the wire. Therefore, when using the class of metals requiring it, and as they require to be worked without heating in order to preserve the beauty of the surface, which is often polished or plated, I remove the skin from a portion of the surface, only leaving a part of the surface unbroken, as shown under the arrow in Fig. 4. The portion O being removed, the end of the shank is bent over, as shown by the dotted lines, with the unbroken skin on the outside diameter.

To reduce to a minimum the risk of fracture when bending, I remove the corner of the wood, as shown at X″ in Fig. 3. This gives a larger diameter over which the bend is made. Short teeth $b$, of suitable shape, are inserted between the legs of the large teeth B by springing outward the angular shanks and forcing them into and entirely or partly through the head. The spaces between the legs of the teeth are thereby reduced in width, preventing short grass, lumps of dirt, &c., from dropping between the teeth. When used for lawn or garden purposes, if desirable, the short tooth may be integral with the large tooth, as shown in the detached view B$^{\times\times}$, Fig. 2.

For the purpose of working close to a fence or corner the end teeth are made of a single wire, the shank passing through the head at right angles with the same. They are bent in a semicircular form and act as a runner or guard when used on lawns. The ends are bent forward in a circle to prevent catching obstructions. The loops D are inserted in the head and bent to the form approximating the braces C in their downward curve, and assist in holding the straw when used in the grainfield. The socket (a plan in section shown at Fig. 8) is made in two pieces, E and E′, which are connected at the shank end by a lug, rivet, or screw. The other end is secured by a tapering sleeve or band, F, driven or shrunk over the ends of the sections E and E′. By making them in sections they can be cast without the necessity of making a core. The shank E″, integral with one section of the socket, is provided with lugs or pins H on each side for securing the braces G G by riveting. The end of the pin is made concave, as shown at H in the detached view. It is made in this form in order to expose as large a surface as possible to the action of the decarbonizing properties in the process of annealing or cementation, which commences at the outside and usually extends but a little below the surface, leaving the interior in a crystalline state. By giving the end of the rivet a concave form the thin edges are thoroughly annealed and admit of easy and thorough riveting.

By making the braces G G in separate pieces and attaching them to the sides of the shank a stronger device is secured, and the braces are more quickly and easily attached than the one shown in my application filed September 3, 1880. One of the braces is shown in position, the other detached. The braces are attached to the head by the spurs G′, integral with the braces G, inserted in the head and clinched. The end E″ of the socket-shank is bifurcated, each prong of which is provided with a spur, P, integral therewith. (Shown at Figs. 6 and 7.) When cast, the points are far enough apart to embrace the head. When the attachment is to be made, the ends are forced together by bending the necks until the spurs are forced into the head, (holes may be made in the head to receive the spurs, if necessary,) thereby securing the end of the shank firmly to the head and dispensing with rivets, &c. The bifurcated ends of the shank may be strengthened by ribs to any extent necessary to secure a firm connection. The ends of the braces G may be bifurcated and secured in the same manner, instead of the spurs, if desirable. The ends of the shank E″ may be dispensed with, if desired, by making the braces C strong enough to hold the head, in which case the shank may be cut off at the line $x$, Fig. 8. The brace or bow C of wire is secured to the socket by winding it around a stud on the socket and passing it under or partly around a pin on each side of the stud. The brace C′ is wound entirely around the socket on each side of the screw L, Fig. 7. Brace C″ is in two parts, and secured to the sleeve F by passing through slits or holes in its sides and bending over the ends. The opposite ends of the braces are secured to the head by tapering and clinching, similar to the teeth-fastenings.

Fig. 7 is a sectional elevation of the socket, showing the manner of securing the handle. In the handle K is cut an inclined slot, (shown at M,) increasing in depth from the point of commencement, forming an angle with the center line of the handle, the point of the wedge formed thereby being nearest the mouth of the socket. The handle is secured by a screw, L, threaded in the socket and forced against a metal plate secured in the inclined slot. The screw being available at any point on the incline admits of interchangeable handles, and also provides for tightening in case of shrinkage in the handle. A wedge-key or cam may be used in place of the screw, if desirable.

I am aware that hoe-shanks have heretofore been made with inclined incisions, into which were adapted to fit a screw carried by a ferrule, to which the handle was connected; also, that shovels have heretofore been provided with an eccentric lever, the eccentricity of which was adapted to extend down into the socket of the shovel, the handle being provided with a transverse recess, into which the lever fitted, so as to lock the shovel and handle together, and therefore do not claim such as my invention.

What I claim as my invention, and desire to secure by Letters Patent, is—

1. In a hand-rake, a series of compound wire teeth, each consisting of a main tooth and a shorter intermediate tooth, substantially as shown and described.

2. In combination with the compound teeth, the rake-head A, braces C, and socket E, substantially as described.

3. In a hand-rake, a series of double wire teeth having shanks bent oblique to their main portion, substantially as shown and described.

4. In a hand-rake, a double wire tooth formed with a series of steps or angles, substantially as shown and described.

5. In a hand-rake, a series of teeth the points of which are gradually raised from a line parallel with the axis of the head, forming a convex line from end to end, whereby the teeth are adapted to work in depressions and between ridges, substantially as shown, and for the purpose set forth.

6. In a garden implement, the shank E'', provided with pins or pegs H on the sides thereof, in combination with braces G G, whereby the braces may be secured to the shank in a longitudinal direction, substantially as shown, and for the purpose described.

7. In an implement-handle socket, the braces G, having spurs or ends G' bent inward, as shown, whereby said braces may be set diagonally in the head, as and for the purpose set forth.

8. In an implement-handle socket, the braces G G, in combination with the bifurcated shank formed of malleable iron and provided with spurs P P, whereby the shank may be clamped to the rake-head, substantially as shown and described.

9. In a garden implement, the combination of the socket, the sleeve F, having perforations f, and braces C'', secured in said perforations, substantially as shown and described.

10. In a hand-rake, a series of teeth the points of which are gradually raised from a line parallel with the axis of the head, forming a convex line from end to end, said teeth also gradually decreasing in length from the center to the end of the rake-head, substantially as shown and described.

11. In a garden implement, the compound socket composed of section E, provided with a shank, and section E', secured by lugs or rivets and sleeve, substantially as shown, and for the purpose set forth.

12. In a garden-rake, the tooth herein described, having its tapering shank or shanks formed by removing the metal from one side only, substantially as shown and described, and for the purpose set forth.

13. A double wire tooth for garden-rakes, formed by removing the metal from opposite sides or corners of each end of the blank, whereby the unbroken surfaces of both shanks may be on the same side when bent into shape, substantially as shown and described.

14. In a hand-rake, the combination, with the shank having a handle-socket and a screw fitted to extend into the socket, of a handle having a seat formed at the side thereof and running toward the upper end and center of the handle, and provided with a plate against which the point of the screw abuts, whereby when the strain tends to withdraw the handle from the socket the plate binds harder against the screw in the direction of its axis.

THEODORE D. DAVIS.

Witnesses:
J. T. ALLEN,
L. R. BROWN.